Nov. 13, 1923. 1,474,034
A. F. HOFF
COMBINED WIND DEFLECTOR AND ANTIGLARE DEVICE
Filed Sept. 29, 1921
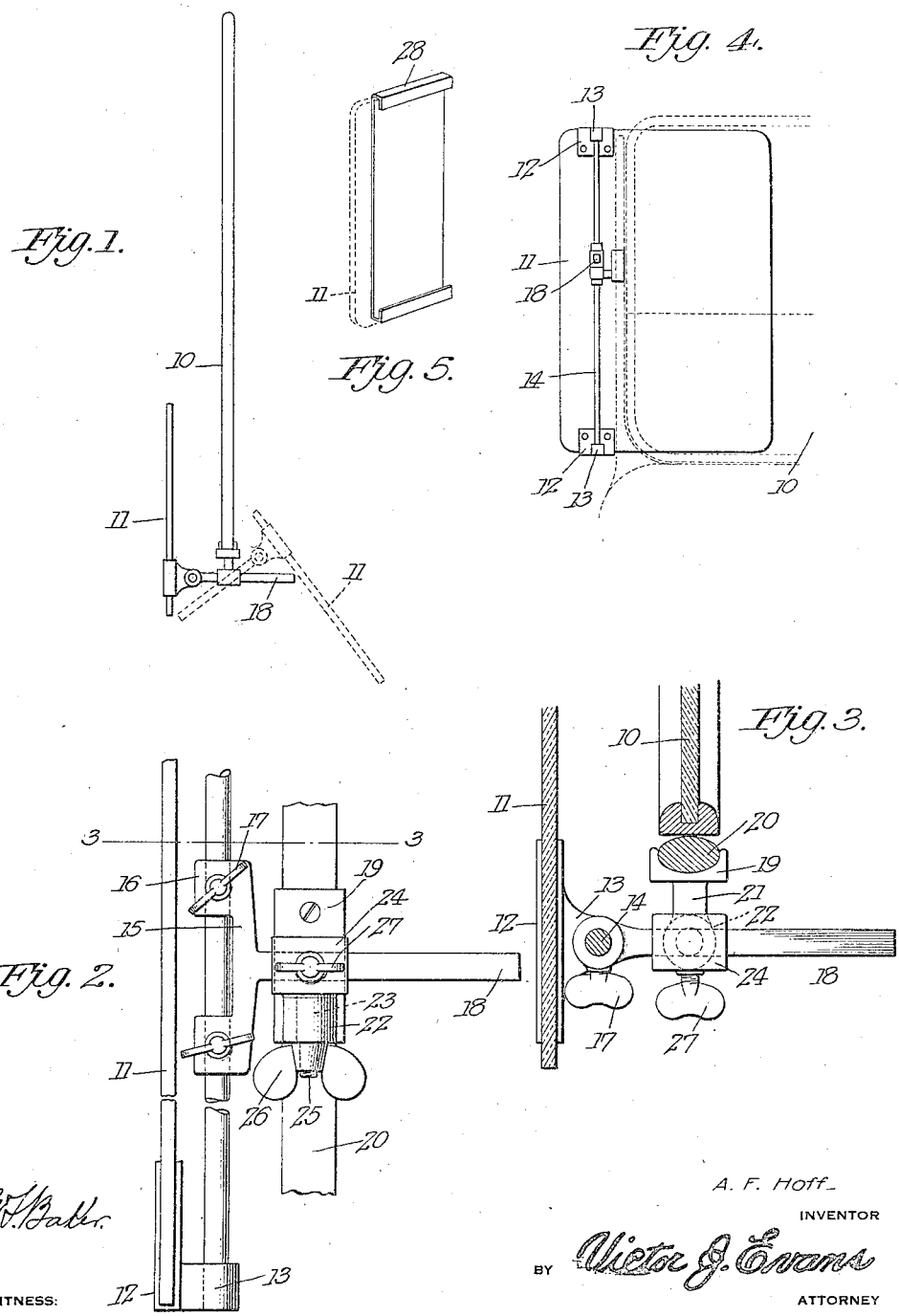

Patented Nov. 13, 1923.

1,474,034

UNITED STATES PATENT OFFICE.

ADAM F. HOFF, OF BINGHAMTON, NEW YORK.

COMBINED WIND DEFLECTOR AND ANTIGLARE DEVICE.

Application filed September 29, 1921. Serial No. 504,068.

*To all whom it may concern:*

Be it known that I, ADAM F. HOFF, a citizen of the United States, residing at Binghamton, in the county of Broome and State of New York, have invented new and useful Improvements in a Combined Wind Deflector and Antiglare Device, of which the following is a specification.

This invention comprehends the provision of a combined wind deflector and anti-glare device for the wind shield of a motor operated vehicle, the device being mounted to permit of it being arranged at any desired angle with respect to the wind shield for use as a wind deflector, or in advance of the wind shield for use as an anti-glare device.

Another object of the invention resides in the provision of a device of the above mentioned character, which may be constructed of suitable translucent or semi-transparent material for use in the capacity of an antiglare device, or it may be constructed of glass or other suitable transparent material with which a covering is used to afford it translucent qualities, when the device serves as an anti-glare medium.

A further object of the invention resides in the provision of a device of the class in question, which can be quickly and conveniently associated with or removed from the wind shield as desired.

A still further object of the invention resides in mounting the said device for adjustment toward or away from the wind shield when positioned in advance of the latter for use as an anti-glare medium, so as to provide ample room for opening of the wind shield outwardly.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:—

Figure 1 is a diagrammatic plan view, showing by full lines the position of the device when used as an anti-glare medium, the dotted lines showing one of the positions occupied by the device when used as a wind deflector.

Figure 2 is an enlarged detail view of the supporting means for said device.

Figure 3 is a sectional view taken on line 3—3 of Figure 2, looking in the direction of the arrow.

Figure 4 is a view looking from the rear of the wind shield, showing the device in position for use as an anti-glare medium.

Figure 5 is a view showing the covering associated with the device affording it translucent qualities.

Referring to the drawing in detail, 10 indicates a wind shield with which the combined wind deflector and anti-glare device is adapted for use. This device consists of a member or wing 11 adapted to be associated with the wind shield 10 in a manner to permit of it being arranged at either side of the wind shield, depending upon the particular purpose for which it is desired to use the same. For instance, the device is susceptible of being positioned in advance of the wind shield 10, either parallel therewith as shown by full lines in Figure 1, or at any desired angle with respect to the wind shield in advance of the latter, when the device is used in the capacity of an anti-glare medium, or it can be swung in a horizontal plane to the opposite side of the wind shield and arranged at any desired angle thereto for use as a wind deflector, as illustrated by dotted lines in Figure 1.

The wing or member 11 is engaged at the upper and lower edges thereof by suitable clamps 12, the latter being formed with alined bosses 13 which receive the terminals of a rod 14 connecting the clamps 12. The rod 14 is mounted for rotation in a bracket 15, the latter being formed with spaced bearings 16 for the rod 14, each bearing having associated therewith a thumb screw or the like 17, which when tightened, holds the rod 14 immovable and the member or wing 11 fixed relatively to the wind shield in its given position. The bracket 15 is formed with the extension 18 which projects from the bracket at a right angle thereto and is used to support the wing or member 11 upon the wind shield 10 in a manner to permit the wing or member to be adjusted toward and away from the wind shield, as the occasion requires, or to permit of the wing or member to be quickly and conveniently associated with or wholly removed from the wind shield at the will of the user.

A clamp 19 designed for association with the standard 20 of the wind shield, includes an extension 21, and carried by this extension is an apertured lug 22. This lug receives a stem 23 which depends from a sleeve-like member 24, the latter being arranged at a right angle to the lug 22 for the reception of the extension 18 of the bracket 15 as clearly shown in Figure 2. Consequently, the sleeve-like member reposes upon the lug 22 for rotation thereon, so that the bracket 15 together with the wing or member 11 can be quickly and easily turned in a horizontal plane with relation to the wind shield 10 to occupy any of the positions above mentioned. The stem 23 is provided with a reduced threaded terminal 25 to accommodate a wing nut or the like 26, which when tightened, holds the rotatable parts above mentioned against movement.

When the wing or member 11 is arranged in advance of the wind shield 10 for use as an anti-glare medium, it is susceptible of adjustment toward and away from said wind shield to provide ample space for the opening of the wind shield outwardly, this being permissible by reason of the fact that the extension 18 of the bracket 15 is capable of sliding movement through the sleeve-like member 24. The sleeve-like member has associated therewith a thumb screw or the like 27 which when tightened to engage the extension 18 holds the member 11 fixed relatively to the wind shield 10 in its adjusted position. The construction is such that the member or swing 11 can be swung to either of the positions illustrated in Figure 1, without detaching the member from the wind shield, it being only necessary to slide the extension 18 through the sleeve-like member 24 to a position whereby the terminal of the extension will clear the standard 20 of the wind shield. It is also manifest, that the wing or member can be wholly separated from the wind shield when its use is not desired. For instance, should the device be used with a sedan or a closed vehicle, it would be only necessary to use the device at night time in the capacity of an anti-glare device, and could be wholly removed from the vehicle during the day.

The wing or member 10 may be constructed of any suitable material possessing translucent or semi-transparent qualities, which renders it particularly advantageous for use as an anti-glare medium. However, any well known wind deflector, which is usually constructed of glass or other transparent material can be mounted upon the wind shield in accordance with the present invention, to permit of its use as a combined wind deflector and anti-glare device.

In this instance, or in other words, if the wing or member 10 is constructed of transparent material, use is made of a cover 28 constructed of any suitable material and which will afford the wing or member 11 translucent or semi-transparent qualities. The cover is designed to be placed upon the wing or member 10 when the latter is to be used as an anti-glare device, and can be quickly removed therefrom during the daytime, when the wing or member 11 is used as a wind deflector in the usual well known manner.

While it is believed that from the foregoing description, the nature and advantages of the invention will be readily apparent, I desire to have it understood that I do not limit myself to what is herein shown and described, and that such changes may be resorted to when desired as fall within the scope of the appended claim.

What I claim is:—

A combined wind deflector and anti-glare device for wind shields comprising a member adapted to be mounted on the wind shield, means for supporting said member for horizontal swinging movements, whereby it can be arranged at either side of the wind shield at any desired angle with respect thereto, a covering for said member to afford the latter translucent qualities, said covering being removably associated with said member, and means for holding said member fixed relatively to the wind shield in any given position.

In testimony whereof I affix my signature.

ADAM F. HOFF.